A. B. PESCATORE.
ELECTRODE FOR ARC SOLDERING.
APPLICATION FILED JUNE 10, 1918.
1,277,639.
Patented Sept. 3, 1918.
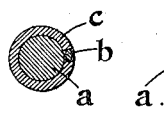
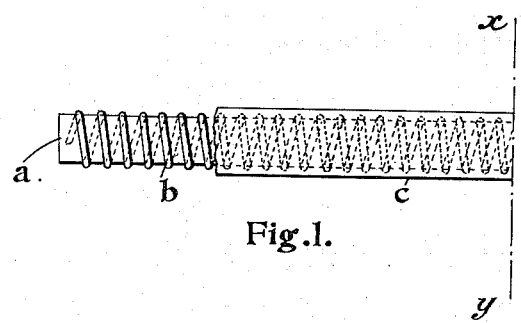
Fig. 2.  Fig. 1.
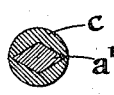
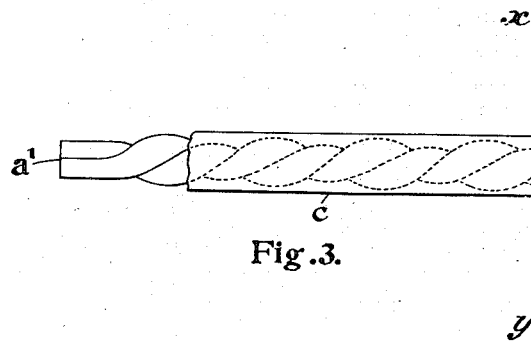
Fig. 4.  Fig. 3.
Inventor
A. B. Pescatore
by
W. E. Evans
Attorney

UNITED STATES PATENT OFFICE.

ANTOINE B. PESCATORE, OF LONDON, ENGLAND.

ELECTRODE FOR ARC-SOLDERING.

1,277,639.  Specification of Letters Patent.  Patented Sept. 3, 1918.

Application filed June 10, 1918. Serial No. 239,343.

*To all whom it may concern:*

Be it known that I, ANTOINE BONAVENTURE PESCATORE, a citizen of the Grand-Duchy of Luxemburg, residing at 24 Upper Hamilton Terrace, London, N. W., England, have invented certain new and useful Improvements in Electrodes for Arc-Soldering, of which the following is a specification.

This invention relates to electrodes of the kind having a covering of a slag-forming material, and which are used for the electric arc soldering or welding of iron or steel. Hitherto these electrodes have been made of square or more generally of round rods of iron or steel, covered with blue asbestos or with a layer of granular or powdered slag-forming material mixed with water-glass or some other agglutinant. Good results appear to have been obtained with asbestos cord, wound on round rods. These electrodes are, however, expensive. They have the further defect when of small diameter, that the asbestos cord cannot be made easily under a certain thickness. In consequence the quantity of slag formed in the fusion is excessive, and makes it difficult to weld small sections, where a thin metal rod must be used.

When the blue asbestos or some other and equivalent material is used in the form of a paste, the electrode is less costly, but the welds produced are not satisfactory. The electrode does not fuse uniformly and in consequence the metal deposited is not continuous. Another defect of the latter type of electrode is due to the fact that the slag-forming material does not always adhere sufficiently to the metal rod.

The invention has among its objects to avoid these defects.

According to the invention an electrode is provided having a cross section variable in the length of the electrode and such that on the fusion of the electrode in use, the arc travels around its circumference or around its edge whereby the electrode fuses regularly, and thus the discontinuity of the metal in the weld resulting from irregular fusion of the electrode is avoided.

The invention comprises the formation of the variable cross section of the electrode for the purpose of effectively supporting the slag forming material whereby the removal or chipping off of this material in transport or handling is avoided, while the invention also comprises the modifications hereinafter described.

In carrying the invention into effect a round iron or steel rod may be employed on which is wound an iron or steel wire, and which is covered by the slag-forming material. Instead of one, two or more wires may be wound on the central rod.

I have found that the wire winding causes the slag forming material to fuse off sharply. In consequence the arc, and the relative positions of the electrode and the weld can be observed more easily when a wire winding is used.

The slag-forming material may be put on as a paste in any convenient way, or it may be put on as a powder after dipping the electrode in water-glass or other agglutinant.

Instead of a central rod around which is wound a wire, the electrode may consist of two or more rods or wires of approximately equal size, twisted around one another; or again an electrode may be made of a single rod of twisted polygonal section or in the form of a screw; or again a round electrode may be used on which a screw thread has been cut.

In the three last mentioned forms, the results obtained are similar to that of the first example, the electrode having such a shape as to give a good hold to the slag-forming material and a regular twisting of the metal or such a disposition of the metal that the arc is caused to move around the axis of the electrode on its fusion in use with a consequent more regular and uniform fusion of the electrode.

When a central rod with one or more wires is used, or two or more wires or rods are twisted together to form the electrode, a further advantage over existing methods of making welding electrodes may be obtained by using different alloys. For instance, the wire may be of a steel containing more carbon, manganese or other metals than that of the rod. This wire will, in consequence, fuse at a lower temperature than the central rod, the effect of this counterbalancing the greater cooling due to the wire being outside the rod. Further, the larger quantities of carbon, manganese, etc., of the steel of which the wire winding is made, make it possible to adjust the quality of the material of the weld in such a manner as to obtain the desired chemical and physical characteristics, independently of or additional to the adjustment obtained by the proportion between the section of the rod and of the wire or wires, and by the variation in the pitch of the winding.

The powdered or granulated slag-forming material may be put on the rod and wire, or on the twisted rod or wires very conveniently in the following manner:—the rod with the wire wound on it, or the twisted rod or wires, are first dipped in the agglutinant in solution emulsion or other condition. They are then passed through a spray of the powdered or granular slag-forming material, and may at the same time be rotated, in order to obtain a coating of uniform thickness. This operation may be repeated until the desired deposit has been applied.

The slag-forming material is made in the usual way, preferably of a mixture that will on fusion yield a calcium and iron silicate, or of blast furnace slag, and powdered or granular ferro-manganese, aluminium, or any other material acting favorably on the steel or iron may be added thereto.

The invention is illustrated in the accompanying drawings which in Figures 1 and 2 illustrate one modification and in Figs. 3 and 4 another.

Fig. 1 is an elevation and Fig. 2 a transverse section on the line $x$—$y$, Fig. 1, of a modification in which wire $b$ is wound around the electrode $a$ and both are covered with a slag forming material $c$.

Figs. 3 and 4 are elevation and transverse sections on the line $x$—$y$ Fig. 3, respectively in which the electrode $a^1$ is a twisted rod of polygonal section covered with a slag forming material $c^1$.

I claim:

1. An iron or steel electrode for use in arc soldering or welding covered with slag-forming material and having a cross-section variable in the length of the electrode and such that on the fusion of the electrode in use, the arc travels around its circumference or edge whereby the electrode fuses regularly substantially as described.

2. An iron or steel electrode for use in arc soldering or welding in which an iron or steel wire forming part of the electrode is embedded in the slag forming material, for the purposes and substantially as described.

3. An iron or steel electrode for use in arc soldering or welding as specified in claim 1 in which the electrode is of polygonal shape, substantially as described.

4. In the manufacture of an iron or steel electrode for use in arc soldering or welding as specified in claim 1, the twisting of two or more wires around one another and covering them with slag-forming material, substantially as described.

5. An iron or steel electrode for use in arc soldering or welding as specified in claim 1, in which the electrode is formed in the shape of a screw, substantially as described.

A. B. PESCATORE.